(12) United States Patent
Radivojevic et al.

(10) Patent No.: US 8,717,680 B2
(45) Date of Patent: May 6, 2014

(54) APPARATUS AND ASSOCIATED METHODS

(75) Inventors: Zoran Radivojevic, Cambridge (GB); Chris Bower, Ely (GB)

(73) Assignee: Nokia Corporation, Espoo (FI)

( * ) Notice: Subject to any disclaimer, the term of this patent is extended or adjusted under 35 U.S.C. 154(b) by 337 days.

(21) Appl. No.: 13/102,443

(22) Filed: May 6, 2011

(65) Prior Publication Data

US 2012/0279422 A1    Nov. 8, 2012

(51) Int. Cl.
   *G02B 1/06*    (2006.01)

(52) U.S. Cl.
   USPC .............. 359/665; 106/18.12; 106/31.26; 359/666; 359/670; 359/721; 359/676

(58) Field of Classification Search
   None
   See application file for complete search history.

(56) References Cited

U.S. PATENT DOCUMENTS

| | | | |
|---|---|---|---|
| 7,265,911 B2 | 9/2007 | Goosey, Jr. et al. | 359/676 |
| 2002/0027300 A1 | 3/2002 | Hartmann et al. | 264/1.1 |
| 2006/0126190 A1 | 6/2006 | Berge et al. | 359/665 |
| 2008/0225378 A1* | 9/2008 | Weikert et al. | 359/319 |
| 2009/0268152 A1* | 10/2009 | Chen | 349/200 |

FOREIGN PATENT DOCUMENTS

| | | | |
|---|---|---|---|
| EP | 2042920 A1 | | 4/2009 |
| JP | 2002-331532 | * | 11/2002 |
| JP | 2002331532 A | | 11/2002 |
| JP | EP2042920 | * | 4/2009 |
| JP | 2009194073 A | | 8/2009 |
| JP | 2009194083 | * | 8/2009 |

OTHER PUBLICATIONS

"Lensfree microscopy on a cellphone", Derek Tseng et al., Lab Chip, vol. 10, Jul. 2010, pp. 1787-1792.
'Better iPhone Macro Shots—at No Cost'. [online], pp. 1-7, Sep. 3, 2009, [retrieved on Aug. 21, 2012]. Retrieved from the Internet: <URL: http://www.theapplepress.com/2009/09/03/better-iphone-macro-shots-at-no-cost/> pp. 1-7.
Sands, S. iPhone photo news: tripods and water drop lenses. [online], p. 1, Sep. 16, 2009, [retrieved on Aug. 21, 2012]. Retrieved from the Internet: <URL: http://www.tuaw.com/2009/09/16/iphone-photo-news-tripods-and-water-drop-lenses/> p. 1.
http://cellscope.berkeley.edu/, "Telemicroscope attachment for healthcare applications", (printed from web May 6, 2011), (2 pages).

* cited by examiner

*Primary Examiner* — Melvin C Mayes
*Assistant Examiner* — Colette Nguyen
(74) *Attorney, Agent, or Firm* — Harrington & Smith (57) ABSTRACT

A coating including a liquid-phobic and/or liquid-philic material, the coating configured to control the shape of a corresponding liquid to form a liquid lens of specific focal length on the coating.

15 Claims, 8 Drawing Sheets

APPARATUS AND ASSOCIATED METHODS

TECHNICAL FIELD

The present disclosure relates to the field of liquid lenses, associated methods and apparatus, and in particular concerns controlling the focal length of a liquid lens using a lens-forming coating comprising a liquid-phobic and/or liquid-philic material. Certain disclosed example aspects/embodiments relate to portable electronic devices, in particular, so-called hand-portable electronic devices which may be hand-held in use (although they may be placed in a cradle in use). Such hand-portable electronic devices include so-called Personal Digital Assistants (PDAs).

The portable electronic devices/apparatus according to one or more disclosed example aspects/embodiments may provide one or more audio/text/video communication functions (e.g. tele-communication, video-communication, and/or text transmission, Short Message Service (SMS)/Multimedia Message Service (MMS)/emailing functions, interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

BACKGROUND

Microscopy is the technical field of using microscopes to view objects that are too small to be seen with the naked eye. There are three well-known branches of microscopy: optical, electron, and scanning probe microscopy.

Optical microscopy involves the diffraction, reflection, or refraction of electromagnetic radiation by an object, and the subsequent collection of the scattered radiation to create an image. This process may be carried out by wide-field irradiation of the sample (e.g. standard light microscopy) or by scanning a fine beam over the sample (e.g. confocal laser scanning microscopy). The development of microscopy revolutionized biology and remains an essential technique in the life and physical sciences.

The combination of an optical microscope with a network-connected mobile device has recently been suggested. A hybrid device of this type has several potentially useful applications. One particular application is in relation to healthcare, where the device could be used to take high resolution images of biological samples and send the images to a remote location for subsequent analysis. Other potential applications include macro photography, security and wellness. For security purposes, the device could be used as part of a verification technique to read micro-text and other fine-print features. The device also allows for the reading of 2D barcodes which have smaller dimensions than the current standard, allowing for considerable space-saving on packaging.

Although several mechanical solutions exist which enable microscopy on mobile devices, they tend to be bulky and relatively expensive.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

According to a first aspect, there is provided a lens-forming coating comprising a liquid-phobic and/or liquid-philic material, the lens-forming coating configured to control the shape of a droplet of corresponding liquid via interactions between the corresponding liquid and the liquid-phobic and/or liquid-philic material to form a liquid lens of specific focal length on the lens-forming coating.

The term "coating" may be taken to encompass both a free-standing (i.e. self-supporting) deposit, and a deposit which is supported by (and which therefore requires the presence of) a solid surface. A free-standing deposit may be formed independently from the surface to which it is subsequently attached/applied. In this way, the coating may be manufactured as an attachment for an apparatus/device and may be sold separately from the apparatus/device as an optional component.

The term "liquid-phobic" may be taken to mean any material which is capable of repelling liquid, and may encompass hydrophobic and lipophobic (oleophobic) materials. Likewise, the term "liquid-philic" may be taken to mean any material which is capable of attracting liquid, and may encompass hydrophilic and lipophilic (oleophilic) materials.

The liquid-phobic material may be a lyophobic material (meaning that it repels solvents), and the liquid-philic material may be a lyophilic material (meaning that it attracts solvents). In this scenario, the solvent (i.e. the corresponding liquid) may be an aqueous, oil-based, or fluorinated solvent.

The lens-forming coating may be configured to control the diameter and/or contact angle of the liquid droplet.

One or more material parameters of the liquid-phobic and/or liquid-philic material may be configured to control the shape of the liquid droplet. The material parameters may comprise one or more of the hydrophobicity, hydrophilicity, lipophobicity, and lipophilicity of the liquid-phobic and/or liquid-philic material.

The liquid-phobic and/or liquid-philic material may be arranged to form a surface energy pattern. The surface energy pattern may comprise liquid-phobic and liquid-philic regions. The liquid-phobic and liquid-philic regions may be substantially identical optically and/or topographically. The surface energy pattern may comprise one or more concentric rings. The diameters of the one or more concentric rings may be configured to control the diameter and/or contact angle of the liquid droplet.

The lens-forming coating may be optically transparent.

The liquid-phobic material may comprise a hydrophobic material (such as a thin film coating of fluoropolymers, fluoroacrylate polymer or other perfluorinated material, silicones, siloxanes, long-chain hydrocarbons, or waxes; or a self-assembled monolayer coating comprising fluoro-alkyl-silanes, fluorinated phosphonates, hydrocarbon or fluorohydrocarbon thiols, or other low surface energy material) and the liquid-philic material may comprise a hydrophilic material (such as glass, silica, alumina or plastic). The corresponding liquid may comprise a polar solvent (e.g. water or a liquid comprising water, ethanol, or acetone).

The liquid-phobic material may comprise a lipophobic material and the liquid-philic material comprises a lipophilic material. The corresponding liquid may comprise a non-polar solvent (e.g. oil or a liquid comprising oil).

According to another aspect, there is provided a device comprising any lens-forming coating described herein.

The device may comprise a liquid lens of specific focal length on the lens-forming coating. The liquid lens may be formed from a droplet of corresponding liquid. The shape of the liquid droplet may be controlled via interactions between the corresponding liquid and the liquid-phobic and/or liquid-philic material.

The device may comprise a camera having a camera window. The camera window may comprise the lens-forming coating.

The device may be one or more of the following: an electronic device, a portable electronic device, a portable telecommunications device, a mobile phone, a camera, a camcorder, a webcam, a tablet computer, a laptop computer, and a module for any of the aforementioned devices.

According to another aspect, there is provided a method of producing a lens-forming coating on a surface, the method comprising:
providing a surface; and
applying a lens-forming coating to the surface, the lens-forming coating comprising a liquid-phobic and/or liquid-philic material, the lens-forming coating configured to control the shape of a droplet of corresponding liquid via interactions between the corresponding liquid and the liquid-phobic and/or liquid-philic material to form a liquid lens of specific focal length on the lens-forming coating.

The lens-forming coating may be applied by wiping the liquid-phobic and/or liquid-philic material onto the surface.

The lens-forming coating may be applied by:
placing a mask over the surface;
depositing the liquid-phobic and/or liquid-philic material onto the mask; and
removing the mask from the surface to leave a surface energy pattern.

The mask may be a sticker. The sticker may be removed from the surface by peeling the sticker from the surface. The liquid-phobic and/or liquid-philic material may be deposited onto the mask using a pen.

According to another aspect, there is provided a method of forming a liquid lens of specific focal length, the method comprising:
providing a lens-forming coating, the lens-forming coating comprising a liquid-phobic and/or liquid-philic material, the lens-forming coating configured to control the shape of a droplet of corresponding liquid via interactions between the corresponding liquid and the liquid-phobic and/or liquid-philic material to form a liquid lens of specific focal length on the lens-forming coating;
depositing a droplet of corresponding liquid onto the lens-forming coating; and
controlling the shape of the liquid droplet using the lens-forming coating to form a liquid lens of specific focal length.

The steps of any method disclosed herein do not have to be performed in the exact order disclosed, unless explicitly stated or understood by the skilled person.

According to a further aspect, there is provided a non-transitory computer-readable memory medium storing a computer program, the computer program comprising computer code configured to perform any method described herein.

The device may comprise a processor configured to process the code of the computer program. The processor may be a microprocessor, including an Application Specific Integrated Circuit (ASIC).

The present disclosure includes one or more corresponding aspects, example embodiments or features in isolation or in various combinations whether or not specifically stated (including claimed) in that combination or in isolation. Corresponding means for performing one or more of the discussed functions are also within the present disclosure.

According to a further aspect, there is provided a coating comprising a liquid-phobic and/or liquid-philic material, the coating configured to control the shape of a corresponding liquid to form a liquid lens of specific focal length on the coating.

The coating may be configured to control the shape of the corresponding liquid via interactions between the liquid and the liquid-phobic and/or liquid-philic material. The coating may be configured to control the diameter and/or contact angle of the liquid. One or more material parameters of the liquid-phobic and/or liquid-philic material may be configured to control the shape of the liquid.

The liquid-phobic and/or liquid-philic material may be arranged to form a surface energy pattern. The surface energy pattern may comprise liquid-phobic and liquid-philic regions. The liquid-phobic and liquid-philic regions may be substantially identical optically and/or topographically. The surface energy pattern may comprise one or more concentric rings. The diameters of the one or more concentric rings may be configured to control the diameter and/or contact angle of the liquid.

The coating may be optically transparent.

The liquid-phobic material may comprise a hydrophobic material and the liquid-philic material may comprise a hydrophilic material. The corresponding liquid may comprise a polar solvent.

The liquid-phobic material may comprise a lipophobic material and the liquid-philic material may comprise a lipophilic material. The corresponding liquid may comprise a non-polar solvent.

According to a further aspect, there is provided an apparatus comprising any coating described herein. It should be noted, however, that the term "apparatus" may be taken to encompass one or more components of a device, a module for a device, or a device itself.

The apparatus may comprise a liquid lens of specific focal length on the coating. The liquid lens may be formed from a corresponding liquid. The shape of the liquid may be controlled by the coating.

The apparatus may comprise a camera having a camera window. The camera window may comprise the coating.

The apparatus may be one or more of the following: an electronic device, a portable electronic device, a portable telecommunications device, a mobile phone, a camera, a camcorder, a webcam, a tablet computer, a laptop computer, and a module for any of the aforementioned devices.

According to a further aspect, there is provided a method of producing a coating on a surface, the method comprising:
providing a surface; and
applying a coating to the surface, the coating comprising a liquid-phobic and/or liquid-philic material, the coating configured to control the shape of a corresponding liquid to form a liquid lens of specific focal length on the coating.

The coating may be applied by wiping the liquid-phobic and/or liquid-philic material onto the surface.

The coating may be applied by:
placing a mask over the surface;
depositing the liquid-phobic and/or liquid-philic material onto the mask; and
removing the mask from the surface to leave a surface energy pattern.

According to a further aspect, there is provided a method of forming a liquid lens of specific focal length, the method comprising:
providing a coating, the coating comprising a liquid-phobic and/or liquid-philic material, the coating configured to control the shape of a corresponding liquid to form a liquid lens of specific focal length on the coating;

depositing a corresponding liquid onto the coating; and
controlling the shape of the liquid using the coating to form a liquid lens of specific focal length.

The above summary is intended to be merely exemplary and non-limiting.

BRIEF DESCRIPTION OF THE FIGURES

A description is now given, by way of example only, with reference to the accompanying drawings, in which:—

DESCRIPTION OF SPECIFIC ASPECTS/EMBODIMENTS

As mentioned in the background section, existing solutions which enable microscopy on mobile devices tend to be bulky and relatively expensive. There will now be described an alternative solution which may or may not address these issues.

Figure 1:
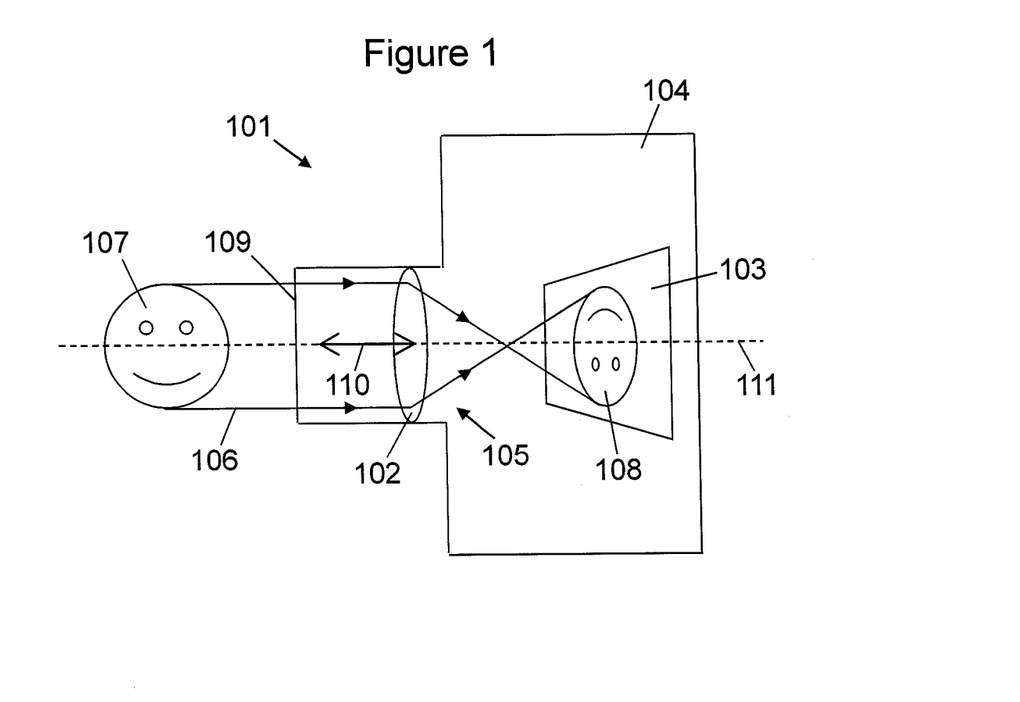
FIG. 1 is a schematic illustration of a standard camera.

FIG. 1 shows the basic structural features of a standard camera 101 for capturing still images. A camera 101 comprises three basic elements: an optical element (the lens 102), a recording element (the film or image sensor 103), and a mechanical element (the camera body 104). The camera body 104 has an opening (aperture 105) at one end which allows light 106 to enter the device 101. The lens 102 is usually positioned in front of the aperture 105 and focuses incoming light 106 (from an object 107) to form an image 108 on the film or image sensor 103. The diameter of the aperture 105 is normally controlled by a diaphragm mechanism (not shown), but some cameras 101 have a fixed aperture size. Most cameras 101 also incorporate a protective window 109 (usually made from glass) in front of the lens 102 to prevent the lens 102 from being damaged.

Figure 2:
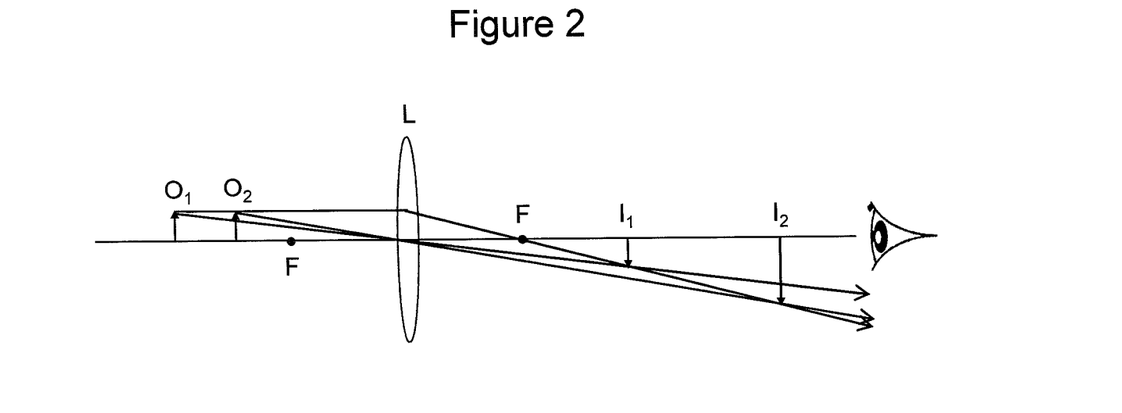
FIG. 2 is a ray diagram showing how an image can be magnified using a single lens.

The magnification of a camera 101 can be varied by physically moving 110 the lens 102 along the optic axis 111 towards or away from the object 107. This is illustrated by the ray diagram shown in FIG. 2. As can be seen from this diagram, the image increases in size ($I_1$ vs $I_2$) as the lens (L) is moved closer to the object ($O_1$ vs $O_2$). Likewise, the image decreases in size as the lens is moved further from the object. For this reason, many modern cameras include a zoom lens so that the user can magnify the image (optical zoom) without the reduction in resolution associated with digital zoom. The use of a zoom lens also allows the user to zoom out for a wide-angled view of the object. The letters "F" in this figure denote the front and rear focal points of the lens for incident rays which are parallel to the optic axis.

Figure 3:
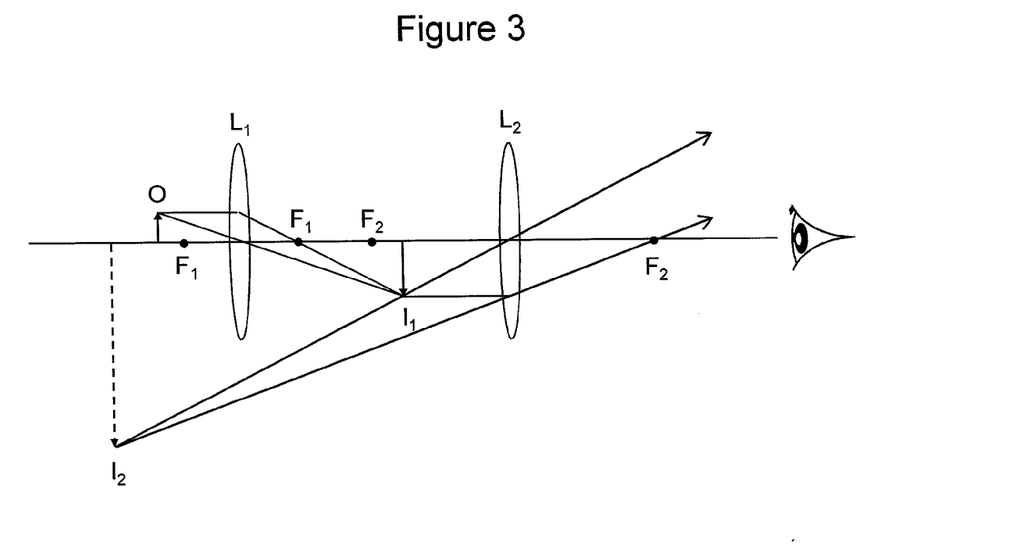
FIG. 3 is a ray diagram showing how an image can be magnified using a pair of lenses.

In order to increase the magnification further, an additional lens is required. The ray diagram in FIG. 3 shows how a compound microscope achieves magnifications of up to 2000× (after which the image quality deteriorates). A compound microscope comprises an objective lens ($L_1$) and an ocular lens ($L_2$). The objective lens is first used to form an enlarged (real) image ($I_1$) of the object (O) on the optic axis between the objective and ocular lenses. The ocular lens then serves as a magnifying glass and produces an enlarged (virtual) image ($I_2$) of the image ($I_1$) produced by the objective lens. The magnification of a compound microscope is therefore determined by multiplying the magnification of the objective lens by the magnification of the ocular lens. The letters "$F_1$" and "$F_2$" in this figure denote the front and rear focal points of the objective and ocular lenses for incident rays which are parallel to the optic axis.

Figure 4:
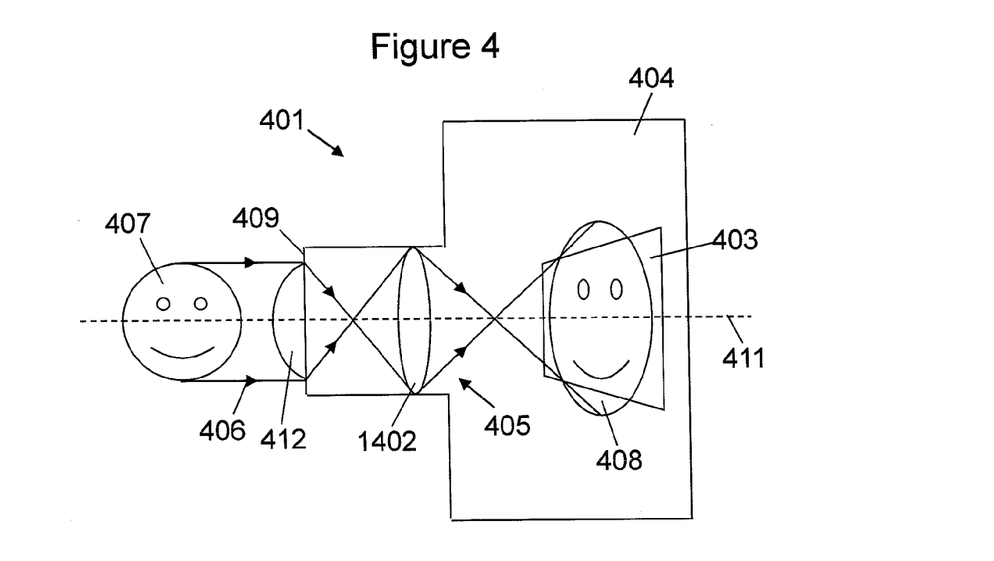
FIG. 4 is a schematic illustration of a camera with a liquid lens formed thereon.

The present disclosure aims to apply this principal to a conventional camera 401 in order to obtain higher magnification imaging than is currently available, without the need for expensive or bulky equipment. This object is achieved through the use of a liquid lens 412 formed on the surface of the camera window 409 which protects the lens 402 (as illustrated in FIG. 4). In some embodiments, the camera window 409 may form part of the camera/device housing 404, whilst in other embodiments, the camera window 404 may form part of a lens assembly which may or may not be detachable from the camera/device housing 404. Furthermore, in some embodiments, the liquid lens 412 may be formed on the surface of an existing camera lens 402 (e.g. a glass lens) instead of the camera window 409. An advantage of using a liquid lens 412 is that it can be removed from the camera window after use to revert back to the camera's original optical arrangement.

The present disclosure also aims to provide a solution which enables a user to change the magnification of the camera 401 by adjusting the shape (and therefore focal length) of the liquid lens 412.

To form the liquid lens first of all, a special coating (referred to herein as a "lens-forming coating") must be applied to the surface of the camera window 409. The lens-forming coating comprises a liquid-phobic and/or liquid-philic material which repels and/or attracts a corresponding liquid, respectively, to create a liquid droplet. In other words, the liquid-phobic and/or liquid-philic material is used to prevent the liquid from spreading out and wetting the surface.

Figure 5:
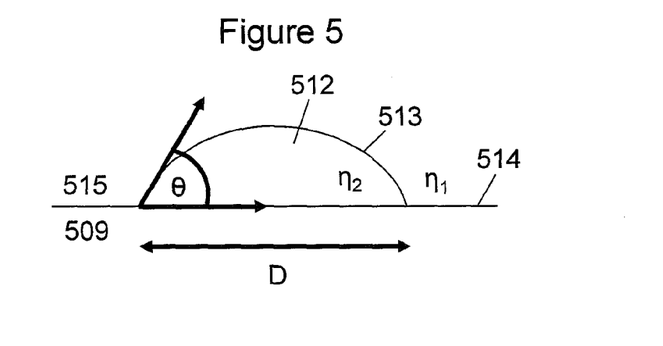
FIG. 5 illustrates the contact angle and diameter of a liquid lens.

FIG. 5 shows a liquid droplet 512 on the surface of a camera window 509. The shape of the droplet 512 is defined by the contact angle (θ) and the droplet diameter (D). The contact angle is the angle at which the liquid/vapour interface 513 meets the solid surface 514, and is determined by the interactions across the three interfaces. If the liquid 512 is very strongly attracted to the solid surface 514 (e.g. a strongly liquid-philic surface), the droplet 512 will spread itself across the surface 514 and the contact angle may be between 0° and 30°. For a less strongly liquid-philic surface 514, the contact angle may be between 30° and 90°. On the other hand, if the surface 514 comprises a liquid-phobic material, the liquid 512 will be repelled by the surface 514 and the droplet 512 may have a contact angle of between 90° and 120° depending on the degree of liquid-phobicity. If there is some roughness present on the surface, contact angles as high as 180° can be obtained by creation of a superhydrophobic surface.

The focal length, f, (and therefore the magnification) of the liquid lens is given by $$f = \frac{D}{2}\sin(\theta)\delta\eta \qquad \text{Equation 1}$$

where δη is the difference in refractive index ($n_2-n_1$) between the liquid 512 and vapour 515 states. The camera magnification can therefore be varied by adjusting the contact angle and/or the droplet diameter. For a fixed volume of liquid, the diameter of the liquid droplet 512 on the surface 514 decreases as the contact angle increases (i.e. both the contact angle and the droplet diameter are varied at the same time). If the volume of liquid is increased or decreased, however, the contact angle may be held fixed whilst the droplet diameter is varied and vice versa. The focal length can also be varied by using liquids with different refractive indices (higher refractive index liquids increasing the focal length of the lens). Specific examples include water (η=1.33), turpentine (η=1.47), and Fluorinert™ (η~1.2).

Figure 6A:
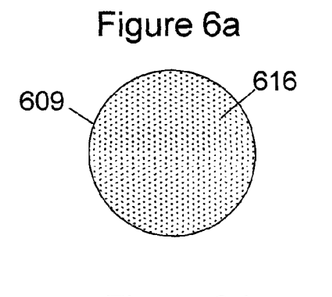
FIG. 6a shows one embodiment of a lens-forming coating.
Figure 7A:
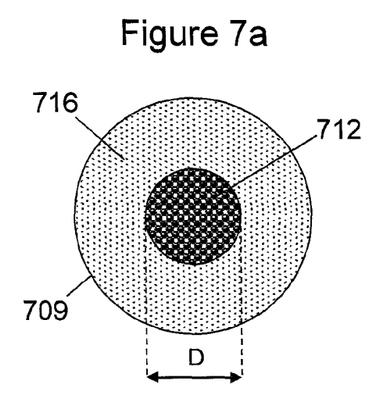
FIG. 7a shows how the lens-forming coating of FIG. 6a can be used to control the diameter of a liquid droplet.
Figure 7B:
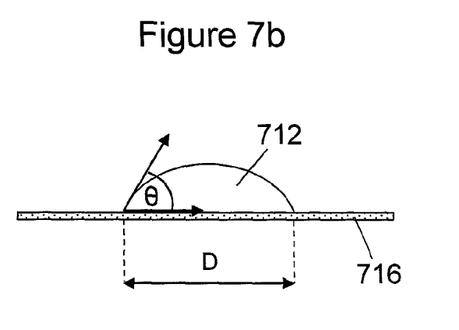
FIG. 7b shows how the lens-forming coating of FIG. 6a can be used to control the contact angle of a liquid droplet.

One way of controlling the shape of the droplet is to vary the degree of liquid-phobicity or liquid-philicity of the lens-forming coating. This may be achieved by selecting particular liquid-phobic and/or liquid-philic materials for the coating based on one or more material parameters (such as the critical surface tension of the material), and is illustrated in FIG. 6a where the camera window 609 has been coated in a liquid-phobic material 616. Due to the repulsive force between the liquid and the liquid-phobic material 616, the liquid forms as a droplet on the camera window 609 (as opposed to wetting the surface). FIGS. 7a and 7b show the liquid droplet 712 on top of the liquid-phobic material 716 in plan view and side view, respectively. The specific contact angle (θ) and droplet diameter (D) will depend on the material parameters.

In this example, however, the position of the liquid droplet may vary depending on where the liquid was deposited, the uniformity of the liquid-phobicity, and the angle of tilt of the surface (i.e. the gravitational force) etc. It may therefore be useful to configure the lens-forming coating in such a way that the liquid-phobic and/or liquid-philic material holds the liquid droplet at a specific location on the surface. This is particularly important for optical applications (such as cameras), as the lenses of the system should be centred on the optic axis to minimise aberrations.

Figure 6B:
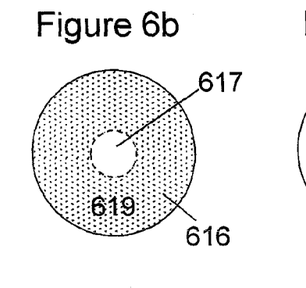
FIG. 6b shows another embodiment of a lens-forming coating.

One way of achieving this is to arrange the liquid-phobic and/or liquid-philic materials on the surface to form a surface energy pattern (as illustrated in FIGS. 6b-6g). In FIG. 6b, a central region 617 of the camera window 609 is left uncoated whilst the surrounding area 619 is coated with a liquid-phobic material 616. The liquid-phobic material 616 acts to repel the liquid in such a way that a droplet is formed and held in place within the central region 617. In this example, the contact angle and droplet diameter are defined by the size of the central region 617.

Figure 6C:
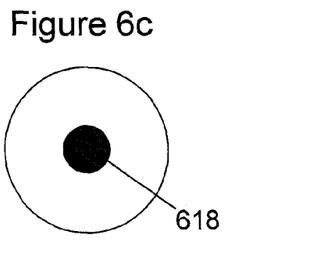
FIG. 6c shows yet another embodiment of a lens-forming coating.

FIG. 6c shows another way of achieving a similar result. In this example, however, the central region 617 is coated with a liquid-philic material 618 and the surrounding area 619 is left uncoated. This time, the liquid droplet is formed and held in place within the central region 617 by the attractive force exhibited by the liquid-philic material 618. Instead of completely filling the central region 617 with a liquid-philic material 618, it may also be possible to form and hold the liquid droplet in the middle of the camera window 609 using a ring of liquid-philic material 618 around the central region 617 (shown in FIG. 6d). The ring in this case defines the circumference of the central region 617 and therefore controls the contact angle and droplet diameter.

In some cases (depending on the material chosen), the attractive or repulsive force associated with a liquid-philic 618 or liquid-phobic 616 material (respectively) may be insufficient to control the shape and position of the liquid droplet on its own. In these situations, it may be desirable to use both liquid-phobic 616 and liquid-philic 618 materials in combination to form the surface energy pattern (as illustrated in FIGS. 6e and 6f).

Figure 6D:
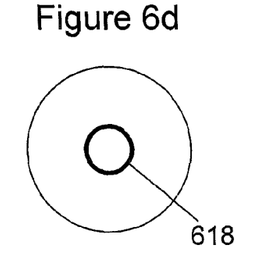
FIG. 6d shows yet another embodiment of a lens-forming coating.
Figure 6E:
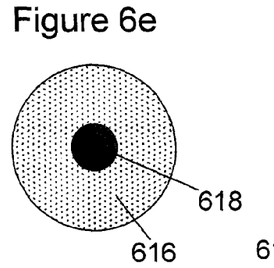
FIG. 6e shows yet another embodiment of a lens-forming coating.

In FIG. 6e, the central region 617 comprises a liquid-philic material 618 whilst the surrounding area 619 comprises a liquid-phobic material 616. In this way, the attractive and repulsive forces work together to form and hold the liquid droplet in place within the central region 617 (and therefore act to control the shape and position of the liquid droplet). FIG. 6f shows a similar arrangement to FIG. 6e except that the central region 617 of the surface comprises a ring of liquid-philic material 618 (as in FIG. 6d) rather than a disc of liquid-philic material 618 (as in FIG. 6c).

Figure 6F:
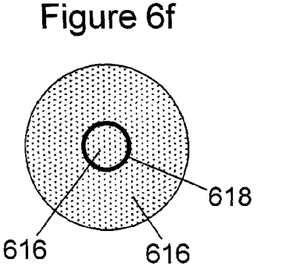
FIG. 6f shows yet another embodiment of a lens-forming coating.
Figure 6G:
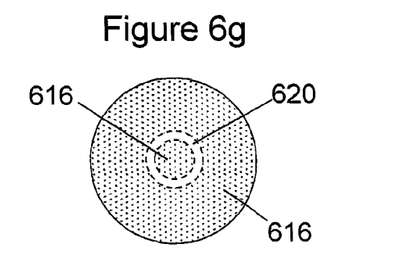
FIG. 6g shows yet another embodiment of a lens-forming coating.

FIG. 6g shows a similar arrangement to FIG. 6f except that the ring of liquid-philic material 618 has been removed to leave a ring-shaped region 620 comprising no liquid-philic 618 or liquid-phobic 616 material (i.e. an air gap). In this example, the liquid-phobic material 616 inside and outside of the exposed ring-shaped region 620 force the liquid in opposite directions, thereby pinning the liquid droplet.

It should be noted, however, that in the examples shown in FIGS. 6b-6g, the liquid droplet would likely need to be deposited directly onto the central region 617 of the surface (e.g. using a pipette or a user's finger), as the attractive and repulsive forces of the liquid-philic 618 and liquid-phobic 616 materials (respectively) are unlikely to be able to move the liquid across the surface. Instead, they are more likely to retain the liquid droplet in place after it has been deposited.

Figure 8A:
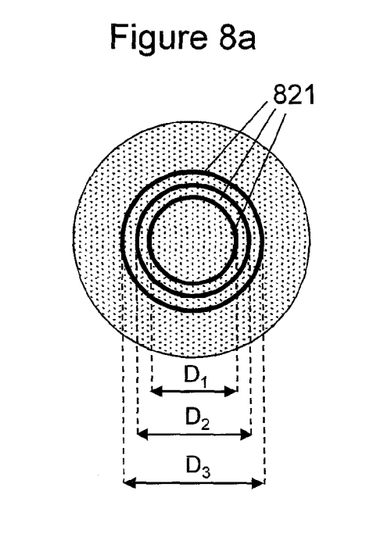
FIG. 8a shows yet another embodiment of a lens-forming coating.

A different surface energy pattern is illustrated in FIG. 8a. In this example, the lens-forming coating comprises a plurality of concentric rings 821 of liquid-philic material 818 surrounded by (i.e. inside and outside each of the liquid-philic rings 821 on the plane of the surface) a liquid-phobic material 816. This arrangement of surface energy pattern works in a similar way to the pattern shown in FIG. 6f. As with the previous example, the diameters ($D_1$-$D_3$) of the rings 821 control the contact angle and diameter of the liquid droplet, and are specifically chosen to form a liquid lens of specific focal length and magnification. The advantage of using multiple rings 821, however, is that the user can select different magnifications simply by pinning the liquid droplet to a ring 821 of different diameter. In practice, this may be achieved by manipulating the droplet on the surface using a pipette (or other object, such as a user's finger). For a constant volume of liquid, this approach would result in a liquid droplet having a different contact angle and diameter (shown in FIG. 8b). Another option would be to vary (increase or decrease) the volume of liquid on the surface using the pipette or equivalent apparatus so that the diameter may be varied without a corresponding change in contact angle.

Figure 8B:
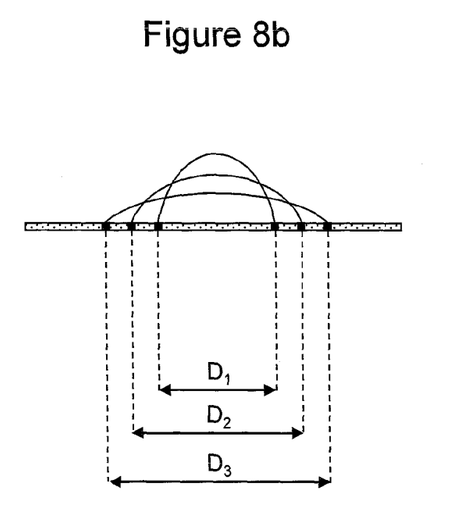
FIG. 8b shows how the lens-forming coating of FIG. 8a can be used to control the diameter and contact angle of a liquid droplet.

The ring pattern (and resulting effects) of FIG. 8a-8b may also be reproduced using the surface configurations of FIGS. 6d and 6g. For example, a similar result may be achieved using the concentric liquid-philic rings without the surrounding liquid-phobic material (as in FIG. 6d), but this may depend on the degree of liquid-philicity of the material used to form the rings. Likewise, the liquid-philic material in FIGS. 8a-8b could be replaced by concentric ring-shaped gaps in the liquid-phobic material (as in FIG. 6g).

Instead of circular regions, the liquid-phobic and/or liquid-philic material may be configured to define differently shaped regions (e.g. elliptical or square regions) to enable the formation of non-hemispherical liquid lenses. For example, an elliptical region may be used to form a wide-angle lens (but might introduce unwanted optical aberrations). It should be noted, however, that the surface tension of the liquid will have the effect of converting sharp edges to smooth curves. As a result, a liquid lens formed using a square region will typically have rounded corners.

For optical applications, it is also important that the lens-forming coating allows light to pass through the coating unperturbed. For this reason, it is preferable that the lens-forming coating (and therefore the liquid-phobic and liquid-philic material) is optically transparent. Furthermore, to ensure that the final image is not adversely affected by the lens-forming coating (i.e. the coating does not introduce unwanted image artefacts), it is preferable if the liquid-phobic and liquid-philic regions are substantially identical optically and/or topographically. The topographical similarity is illustrated in FIG. 8b, where the lens-forming coating has an even thickness across the whole of the surface despite the fact that the coating comprises both liquid-phobic and liquid-philic material.

A number of different fabrication techniques may be used to produce the lens-forming coating on the surface of the camera window (or glass lens), and the chosen technique may depend on the complexity of the surface energy pattern, the materials used, the facilities available, cost, time, and possibly other factors.

Where a coating of liquid-phobic material across the entire surface is required (e.g. FIG. 6a), the coating may be applied simply by wiping the liquid-phobic material onto the surface and spreading it to obtain an even thickness (particularly if the material spontaneously forms a self-assembled monolayer, as in the case of phosphonates and silanes). If the uniformity in thickness is particularly important, it may be preferable to adopt a more precise deposition process such as chemical vapour deposition.

If a surface energy pattern is required (e.g. FIGS. 6b-6g), it may be necessary to use a mask of some kind. When the feature size (e.g. the dimensions of the rings) is relatively large (e.g. greater than or equal to 1 mm), it may be possible to use a peel-off sticker (or other mask) containing one or more predefined holes in the shape of the desired pattern. The peel-off sticker could then be attached to the camera window and a layer of liquid-phobic or liquid-philic material deposited on top of the sticker. Any material deposited on top of the holes would bind (bond or adsorb) to the underlying surface. After deposition, the peel-off sticker could then be peeled from the surface to reveal a pattern of liquid-phobic or liquid-philic material. The peel-off sticker may be a protective sticker applied to the camera window before first sale of the camera/device.

Furthermore, when the feature size is relatively large, it may be possible to apply (deposit) the liquid-phobic or liquid-philic material to the surface using some kind of applicator. In some embodiments, the applicator may be a pen containing the liquid-phobic or liquid-philic material in liquid form. The use of a pen may enable an end user of the camera/device to apply the lens-forming coating themselves, rather than requiring the camera/device manufacturer to apply the coating. This could allow the user to apply different coatings for different applications (but assumes that each coating can easily be removed before the next coating is applied). Alternatively, an elastomeric stamp which has a predefined pattern of raised areas may be used to transfer liquid-phobic and/or liquid-philic material to the camera window. Such a stamp can be fabricated from polydimethylsiloxane (PMDS) or similar elastomeric material, and impregnated with a fluoroalkyl silane, fluorinated phosphonate or other self-assembled monolayer (SAM) forming material such that the stamp is effectively dry when it is placed onto the camera window, and the SAM forming material is deposited in the prescribed pattern. This method allows for extremely high resolution features (less than 1 μm) to be patterned.

When the feature size is relatively small (e.g. less than 1 mm), however, it may be necessary to use lithographic techniques instead or a peel-off sticker (although these techniques tend to be relatively expensive, time consuming, and require specialist equipment). One example would be to define the pattern in a layer of resist using electron beam lithography or photolithography, followed by development, material deposition and lift-off steps. In this example, the developed resist would serve as a mask during subsequent deposition of the liquid-phobic or liquid-philic material. Another option would be to deposit the liquid-phobic or liquid-philic material first, and then deposit a layer of resist on top of the material. After exposure (again, using electron beam lithography or photolithography) and development of the resist, wet or dry etching could be used to remove the exposed regions of the underlying liquid-phobic or liquid-philic material. Clearly, these techniques are intended to be used by a manufacturer of the camera/device, and not by an end user.

Regardless of the feature size, it may be necessary to repeat the appropriate patterning steps for each material when both a liquid-phobic material and a liquid-philic material need to be deposited.

Figure 10A:
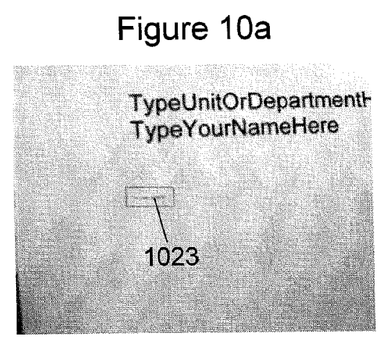
FIG. 10a shows an image of a test sample containing 1 pt printed text captured using a camera with no liquid lens formed thereon.
Figure 10B:
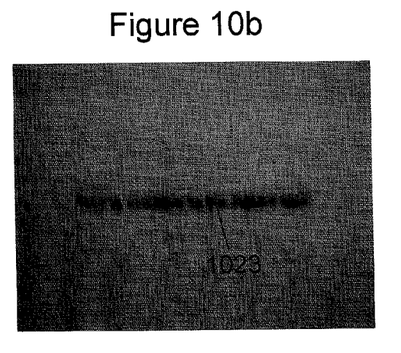
FIG. 10b shows an image of the test sample of FIG. 10a captured using the same camera but with a liquid lens formed thereon.
Figure 11A:
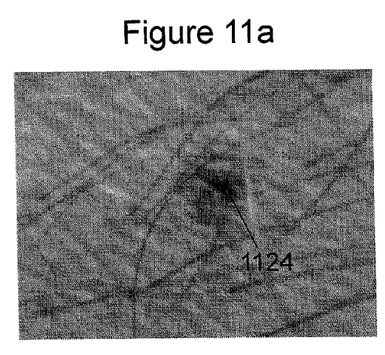
FIG. 11a shows an image of a skin sample containing a birthmark captured using a camera with a liquid lens formed thereon.
Figure 11B:
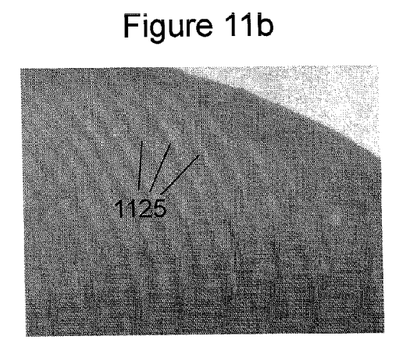
FIG. 11b shows an image of a fingerprint containing a number of ridges captured using a camera with a liquid lens formed thereon.

To demonstrate the potential of the liquid lens described herein, three different imaging experiments were performed using a mobile camera phone. The results of these experiments are shown in FIGS. 9-11.

In the first experiment (FIG. 9), the digital camera of a Nokia 6700 mobile phone was used to capture images of a test sample containing printed text 922 of increasing point size. In this experiment, the camera window was coated in a few nanometers of fluoroacrylate polymer (a hydrophobic material). It was found from these experiments that a water droplet of between 5 and 50 μl was optimal for forming the liquid lens.

Figure 9A:
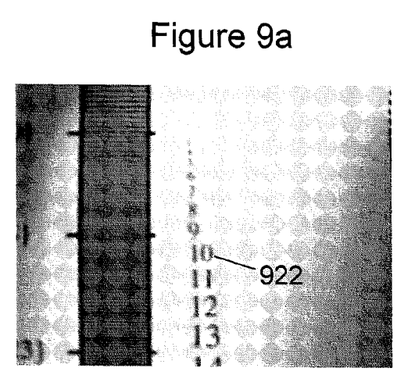
FIG. 9a shows an image of a test sample containing printed text captured using a camera with no liquid lens formed thereon.
Figure 9B:
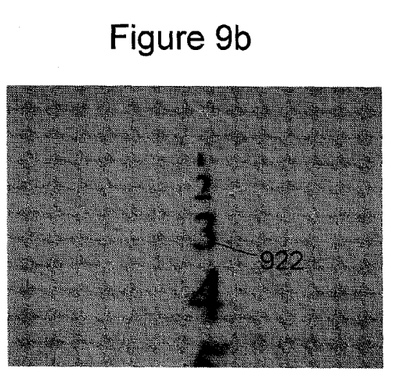
FIG. 9b shows an image of the test sample of FIG. 9a captured using the same camera but with a 3 mm diameter liquid lens formed thereon.
Figure 9C:
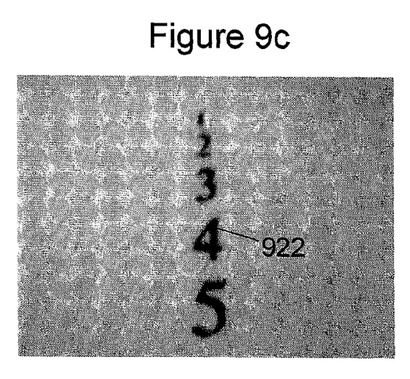
FIG. 9c shows an image of the test sample of FIG. 9a captured using the same camera but with a 4 mm diameter liquid lens formed thereon.
Figure 9D:
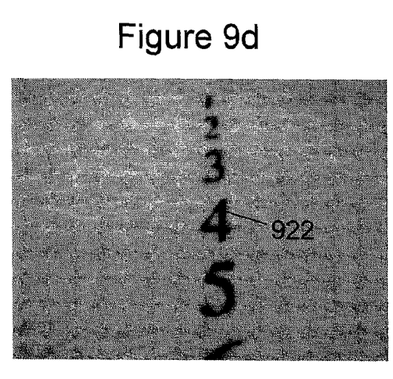
FIG. 9d shows an image of the test sample of FIG. 9a captured using the same camera but with a 5 mm diameter liquid lens formed thereon.

FIG. 9a shows an image taken before any water was deposited on the hydrophobic layer, whilst FIG. 9b shows a corresponding image taken after a 10 μl droplet of water was formed on the surface of the camera window (having a contact angle of ~90° and a droplet diameter of 3 mm). As can be seen from the images, the text 922 was greatly magnified by the liquid lens. To vary the diameter and contact angle of the water droplet, a pipette was used to spread the droplet over a wider area of the surface (whilst keeping the volume constant). FIGS. 9c and 9d show images taken with a droplet diameter of 4 mm and 5 mm, respectively. As can be seen from these images, the magnification decreased with increasing droplet diameter which is consistent with Equation 1.

In the second experiment (FIG. 10), the same mobile camera phone was used to capture images of a test sample containing the words "This is invisible to the naked eye" in 1 pt text 1023 (inside the rectangular box). FIG. 10a shows an image taken before any water was deposited on the hydrophobic layer, whilst FIG. 10b shows a corresponding image taken after a 10 μl droplet of water was formed on the surface of the camera window (although the contact angle and droplet diameter were not measured). As a result of forming the liquid lens, the initially illegible text 1023 became legible. It is important to point out here, that whilst the image in FIG. 10b appears somewhat blurred, it was of a far higher resolution when viewed live on the camera display screen. The reduction in image quality was in fact caused by heavy file compression when the image was saved using the camera phone.

In the third and final experiment (FIG. 11), the same hydrophobic coating as before was applied to the camera window of a Nokia E90 mobile phone before a liquid lens was formed on top of the coating. The camera phone was then used to capture magnified images of a skin sample (FIG. 11a) and fingerprint (FIG. 11b). A birthmark 1124 can be seen in the image of the skin sample, and fingerprint ridges 1125 can be seen in the image of the fingerprint.

Figure 12:
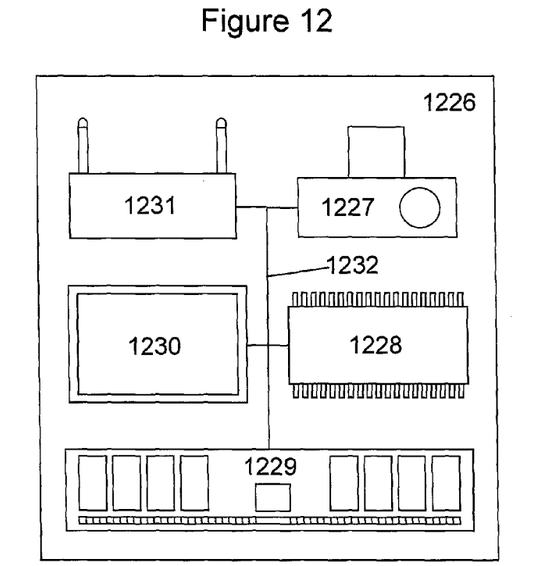
FIG. 12 shows a device comprising the lens-forming coating described herein.

In FIG. 12, there is shown a device 1226 comprising the lens-forming coating described herein. The device comprises a camera 1227, a processor 1228, a storage medium (or memory) 1229, an electronic display 1230, and a transceiver 1231, which are electrically connected to one another by a data bus 1232. It will be appreciated that any reference herein to a processor 1228 and a storage medium 1229 may be a reference to one more processors or storage media/memories. In particular, the lens-forming coating is provided on the camera window or lens of the camera 1227. The device 1226 may be an electronic device, a portable electronic device, a portable telecommunications device, a mobile phone, a camera, a camcorder, a webcam, a tablet computer, a laptop computer, or a module for any of the aforementioned devices.

The camera 1227 is a digital compact (point-and-shoot) or single-lens reflex (SLR) camera configured to capture digital still and possibly moving images. The camera 1227 comprises a camera window, at least one lens (e.g. glass objective lens), a fixed or variable aperture, and an image sensor.

The processor 1228 is configured for general operation of the device 1226 by providing signalling to, and receiving signalling from, the other device components to manage their operation. The processor 1228 may be a microprocessor, including an Application Specific Integrated Circuit (ASIC).

The storage medium 1229 is configured to store computer code configured to perform, control or enable operation of the device 1226. The storage medium 1229 may also be configured to store computer code configured to perform, control or enable one or more of the method steps illustrated in FIGS. 13 and 14. The storage medium 1229 may also be configured to store one or more digital images captured using the camera 1227. Furthermore, the storage medium 1229 may be configured to store settings for the other device components. When the storage medium 1229 is used to store settings for the other device components, the processor 1228 may access the storage medium 1229 to retrieve the settings in order to manage operation of the other device components.

In addition, the storage medium 1229 may be configured to store a graphical user interface which enables a user to control the functionality of the device 1226. The graphical user interface may enable the user to set/adjust any user-configurable device settings via an on-screen control panel. In particular, the graphical user interface may allow the user to alter, delete and save images previously captured using the camera 1227.

The storage medium 1229 may be a temporary storage medium such as a volatile random access memory. On the other hand, the storage medium 1229 may be a permanent storage medium such as a hard disk drive, a flash memory, or a non-volatile random access memory.

The electronic display 1230 is configured to present digital images captured using the camera 1227 to a user of the device 1226. The electronic display 1230 may also serve as an electronic viewfinder for the camera 1227 to enable the user to see what the camera 1227 "sees" before capturing the image. In addition, the electronic display 1230 may be used to display previously captured images.

The electronic display 1230 may also be configured to display the graphical user interface, and may comprise additional touch-screen keys for navigation of the user interface. Furthermore, the electronic display 1230 may be an LED (light-emitting diode), LCD (liquid crystal display) or plasma display, and may comprise touchscreen technology.

The transceiver 1231 is configured to exchange data between the device 1226 and one or more remote devices. Data may be exchanged between the device 1226 and the one or more remote devices using wireless internet technology, wherein the wireless technology is one or more of the following: a Wi-Fi network, a mobile telephone network, a satellite internet service, and a Worldwide Interoperability for Microwave Access (WiMax) network. In particular, the transceiver 1231 may be configured to transmit images captured using the camera 1227 to the one or more remote devices. The transceiver 1231 may comprise a separate transmitter and receiver. Alternatively, the transmitter and receiver may be combined as a single device sharing common circuitry and a single housing.

Figure 13:
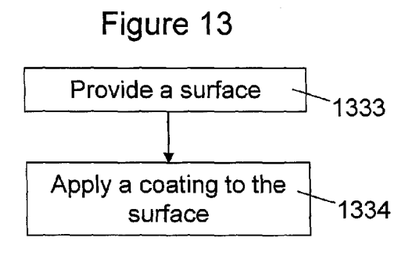
FIG. 13 shows the key steps of a first method described herein.
Figure 14:
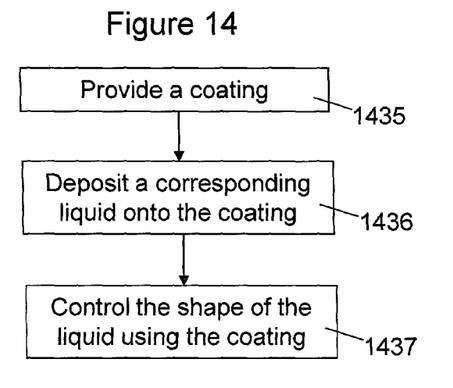
FIG. 14 shows the key steps of a second method described herein.

The main steps 1333-1334 of a method for producing a lens-forming coating on a surface are illustrated schematically in FIG. 13. The main steps 1435-1437 of a method for producing a liquid lens of specific focal length are illustrated schematically in FIG. 14.

Figure 15:
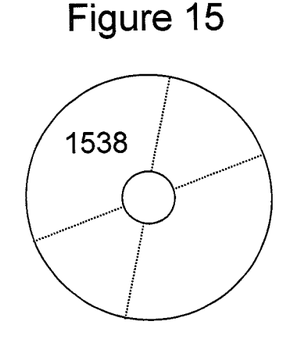
FIG. 15 shows a computer readable medium providing a computer program for carrying out the methods described herein.

FIG. 15 illustrates schematically a non-transitory computer/processor readable medium 1538 providing a computer program according to one embodiment. In this example, the computer/processor readable medium 1538 is a disc such as a digital versatile disc (DVD) or a compact disc (CD). In other embodiments, the computer/processor readable medium 1538 may be any medium that has been programmed in such a way as to carry out an inventive function. The computer/processor readable medium 1538 may be a removable memory device such as a memory stick or memory card (SD, mini SD or micro SD).

The computer program may comprise computer code configured to perform, control or enable one or more of the following method steps: providing a surface; and applying a lens-forming coating to the surface, the lens-forming coating comprising a liquid-phobic and/or liquid-philic material, the lens-forming coating configured to control the shape of a droplet of corresponding liquid via interactions between the corresponding liquid and the liquid-phobic and/or liquid-philic material to form a liquid lens of specific focal length on the lens-forming coating.

The computer program may also comprise computer code configured to perform, control or enable one or more of the following method steps: providing a lens-forming coating, the lens-forming coating comprising a liquid-phobic and/or liquid-philic material, the lens-forming coating configured to control the shape of a droplet of corresponding liquid via interactions between the corresponding liquid and the liquid-phobic and/or liquid-philic material to form a liquid lens of specific focal length on the lens-forming coating; depositing a droplet of corresponding liquid onto the lens-forming coating; and controlling the shape of the liquid droplet using the lens-forming coating to form a liquid lens of specific focal length.

Other embodiments depicted in the figures have been provided with reference numerals that correspond to similar features of earlier described embodiments. For example, feature number 1 can also correspond to numbers 101, 201, 301 etc. These numbered features may appear in the figures but may not have been directly referred to within the description of these particular embodiments. These have still been provided in the figures to aid understanding of the further embodiments, particularly in relation to the features of similar earlier described embodiments.

It will be appreciated to the skilled reader that any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

It will be appreciated that any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

It will be appreciated that any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

It will be appreciated that the term "signalling" may refer to one or more signals transmitted as a series of transmitted and/or received signals. The series of signals may comprise one, two, three, four or even more individual signal components or distinct signals to make up said signalling. Some or all of these individual signals may be transmitted/received simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to different embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical side to secure wooden parts together, whereas a screw employs a helical side, in the environment of fastening wooden parts, a nail and a screw may be equivalent structures.

The invention claimed is:

1. A coating comprising a liquid-phobic and/or liquid-philic material, the coating configured to control the shape of a corresponding liquid to form a liquid lens of specific focal length on the coating, the liquid lens being formed on an exterior surface of a camera window.

2. The coating of claim 1, wherein the coating is configured to control the shape of the corresponding liquid via interactions between the liquid and the liquid-phobic and/or liquid-philic material.

3. The coating of claim 1, wherein the coating is configured to control the diameter and/or contact angle of the liquid.

4. The coating of claim 1, wherein the liquid-phobic and/or liquid-philic material is arranged to form a surface energy pattern.

5. The coating of claim 4, wherein the surface energy pattern comprises liquid-phobic and liquid-philic regions.

6. The coating of claim 4, wherein the surface energy pattern comprises one or more concentric rings, the diameters of the one or more concentric rings configured to control the diameter and/or contact angle of the liquid.

7. The coating of claim 1, wherein the coating is optically transparent.

8. The coating of claim 1, wherein the liquid-phobic material comprises a hydrophobic material and the liquid-philic material comprises a hydrophilic material.

9. The coating of claim 8, wherein the corresponding liquid comprises a polar solvent.

10. The coating of claim 1, wherein the liquid-phobic material comprises a lipophobic material and the liquid-philic material comprises a lipophilic material.

11. The coating of claim 10, wherein the corresponding liquid comprises a non-polar solvent.

12. A method of producing a coating on a surface, the method comprising:
providing a surface;
and applying a coating to the surface, the coating comprising a liquid-phobic and/or liquid-philic material, the coating configured to control the shape of a corresponding liquid to form a liquid lens of specific focal length on the coating, the liquid lens being formed on an exterior surface of a camera window.

13. The method of claim 12, wherein the coating is applied by wiping the liquid-phobic and/or liquid-philic material onto the surface.

14. The method of claim 12, wherein the coating is applied by:
placing a mask over the surface;
depositing the liquid-phobic and/or liquid-philic material onto the mask; and
removing the mask from the surface to leave a surface energy pattern.

15. A method of forming a liquid lens of specific focal length, the method comprising: providing a coating, the coating comprising a liquid-phobic and/or liquid-philic material, the coating configured to control the shape of a corresponding liquid to form a liquid lens of specific focal length on the coating; depositing a corresponding liquid onto the coating; and controlling the shape of the liquid using the coating to form a liquid lens of specific focal length, the liquid lens being formed on an exterior surface of a camera window.

* * * * *